UNITED STATES PATENT OFFICE.

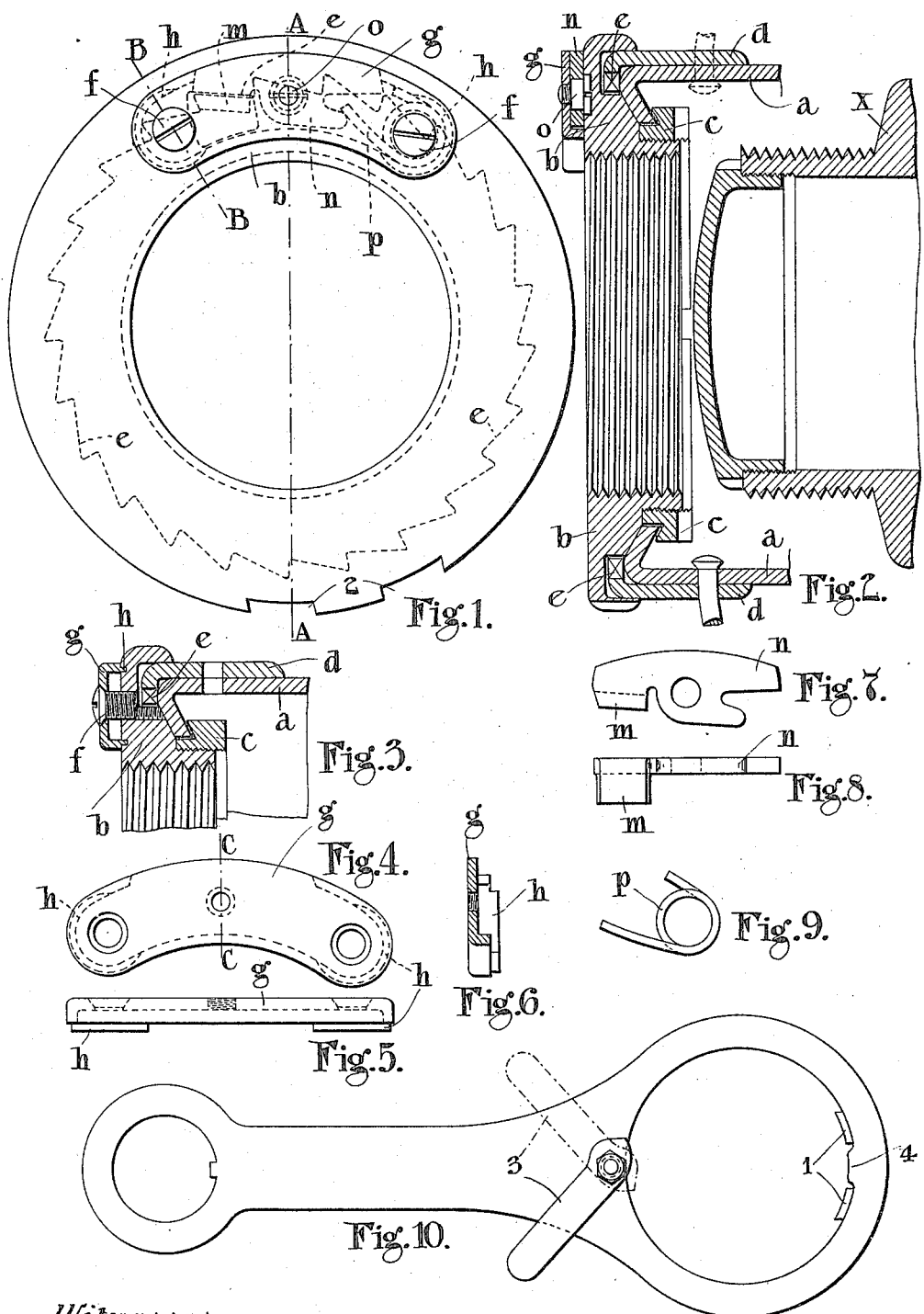

JOHN VERNON PUGH, OF ALLESLEY, COVENTRY, ENGLAND.

DETACHABLE WHEEL.

1,145,701.  Specification of Letters Patent.  Patented July 6, 1915.

Application filed August 30, 1909, Serial No. 515,237. Renewed November 30, 1914. Serial No. 874,907.

*To all whom it may concern:*

Be it known that I, JOHN VERNON PUGH, a subject of the King of Great Britain and Ireland, and residing at Guiting House, Allesley, Coventry, in the county of Warwick, England, have invented certain new and useful Improvements in Detachable Wheels, of which the following is a specification.

This invention relates to detachable wheels of the kind in which a detachable hub part, carrying the spokes and felly, is mounted upon a permanent hub part. In such wheels, it is used to hold the outer hub part upon the inner by means of a lock-nut or ring, provided with a pawl device to prevent loosening of the lock-nut or ring. The pawl locking devices at present in use, however, are open to the objection that if they jam, so that they cannot be pushed out of engagement with their notches, the wheel can only be taken to pieces after somewhat violent handling, which is liable to produce expensive damage to the wheel. Moreover, access cannot be had to the pawl without removing the wheel, and dismantling the withdrawing nut.

The object of the present invention is to provide an improved locking device, by which the above mentioned objections may be avoided, without reducing the security of the locking effect.

The invention consists in mounting upon the outside of the locking ring or nut, a pawl with an engaging end passing through a slot in the ring or nut, to engage with teeth formed in one of the hub parts, say the outer, this pawl being entirely inclosed by a cover; and a part of the pawl element being adapted to be acted on by a spanner or a cam or the like acting thereon to release the pawl from engagement with the ratchet teeth.

According to the invention, the pawl is accessible for inspection or removal, and it is unnecessary to take off the wheel, or even the lock ring, in order to inspect or entirely remove the pawl.

The invention also consists in the improved locking device hereinafter indicated.

Referring now to the accompanying drawings; Figure 1 is an elevation of the locking ring showing my improved pawl locking device inclosed within a cover. Fig. 2 is a section on the line A—A of Fig. 1, showing part of the removable outer and permanent inner hub parts. Fig. 3 is a section on the line B—B of Fig. 1, Figs. 4 and 5 show plan and elevation respectively of the cover inclosing the pawl-locking devices, while Fig. 6 is a section on the line C—C, Figs. 4 and 5, Figs. 7 and 8 show a plan and elevation respectively of the pawl, while Fig. 9 represents a spring for pressing on the pawl, Fig. 10 represents a spanner for use with the modification shown in Figs. 1 to 9.

In carrying the invention into effect according to the construction shown in Figs. 1, 2 and 3 the outer hub part, $a$, is held on the inner hub part $x$ by means of the locking ring, $b$, which also carries a withdrawing ring, $c$. Attached to the outer hub part, $a$, is another ring, $d$, provided with ratchet teeeth or other suitable castellations as shown at $e$.

Attached to the locking ring, $b$, by means of two screws, $f$, is a cover, $g$, shown in detail in Figs. 4, 5 and 6 and the ends of the cover are provided with bosses, $h$, which may be rounded and which enter corresponding recesses in the locking ring, $b$, or the rounded ends of the cover, $g$, may each engage about one half of an annular groove cut in the ring.

The pivot for the pawl, $n$, (shown in Figs. 7 and 8) may be formed by a screw, $o$, which screws into the cover, $g$, a recess being provided in the locking ring, $b$, to accommodate the head of the screw. The screw, $o$, may if desired screw into the locking ring or the pivot for the pawl, $n$, may be formed by a pin on the locking ring entering a corresponding hole in the cover. A projection, $m$, on the pawl projects through a slot in the locking ring, $b$, to engage with the ratchet teeth on the ring, $d$, fixed on the outer hub part, $a$. A portion of the flange on the cover, $g$, is cut away and the pawl, $n$, is so shaped that it lies flush with the edge of the cover, $g$, when in its normal position. The spring, $p$, shown in Fig. 9 is passed over one of the screws, $f$, and engages with the pawl, $n$, as shown in Fig. 1. By this means a very secure anchorage is afforded for the pawl although the whole pawl locking device may be very easily removed without taking off the wheel from its axle or hub. Moreover if the locking device becomes damaged the lock ring and pawl may be very easily replaced by an inexpensive spare. It will be seen that if the pawl jams the projecting end of it may be tapped so as to force it into position.

A suitable form of spanner for removing the locking ring is shown in Fig. 10, and is applied in the following manner. The end carrying the projections, 1, is applied first, these projections entering the recesses, 2, on the locking ring b. The cam end is then engaged and the cam, 3, is moved from the positions shown in full lines to that indicated by the dotted lines. In this latter position the cam, 3, enters the slot on the top of the cover, g, thus depressing the pawl, n, and causing the extension, m, to disengage from the ratchet teeth e, formed on the outer hub member, a. It will be evident that while the pawl, n, is depressed, it is impossible to remove the spanner from the locking ring, b, two projections, 4, on the spanner placed preferably near the already mentioned projections, 1, and engaging with the sides of the locking ring, b, acting in conjunction with the cam, 3, and the cover g, to prevent this.

In the case of the inclosed pawl the two screws which secure the cover, g, to the ring may be prevented from accidental unscrewing by means of a spring plate fitting over the heads of the screws and riveted or otherwise secured to the pin which passes through the pawl or the screws may be secured against unscrewing by lightly riveting over when the ring is out of the hub.

Although in the drawings I have shown a locking ring having a conical surface engaging with a similar conical surface on the outer hub member, it is to be understood that such an arrangement does not in any way form part of the subject matter of the present invention and is therefore not claimed in this specification.

It will be seen that many modifications may be made in the method of carrying this invention into effect without in any way departing from the spirit of the same.

Having now described my invention what I claim as new and desire to secure by Letters Patent is:

1. A pawl locking device for detachable wheels comprising in combination an outer and an inner hub part, a screwed member for holding the outer hub part in position on the inner hub part, a cover removably secured to said member, a locking pawl pivotally mounted on the inside of said cover, a slot in said member, and a projection on said pawl extending through said slot to engage with castellations on the outer hub part, whereby on removing said cover the pawl is removed from the screwed member while the latter is acting to hold the outer hub part in position on the inner hub part.

2. A pawl locking device for detachable wheels comprising in combination, an outer and an inner hub part, a screwed member for holding the outer hub part in position on the inner hub part, a plate having flanged edges removably fastened with said edges bearing on the face of said member thus providing a space between said member and said plate, a pawl pivoted on the inside of said plate and capable of movement in said space, a slot in said member, and a projection on said pawl extending through said slot to engage with castellations on the outer hub part, whereby on removing said plate the pawl is removed from the screwed member while the latter is acting to hold the outer hub part in position on the inner hub part.

3. A pawl locking device for detachable wheels comprising in combination an outer and an inner hub part, a screwed member for holding the outer hub part in position on the inner hub part, a plate having flanged edges fastened by two screws on the face of said member, said edges bearing upon said face and thus providing a space between said member and said plate, a pawl pivoted on the inside of said plate and capable of movement in said space, a slot in said member, a projection on said pawl extending through said slot to engage with castellations on the outer hub part, and a spring positioned in one end of said space and retained therein by one of said screws and acting upon said pawl to retain it in engagement with said castellations, but allowing disengagement of said pawl for backward rotation of said nut, whereby on removing said plate the pawl is removed from the screwd member while the latter is acting to hold the outer hub part in position on the inner hub part.

4. In combination in a detachable wheel, an outer and an inner hub part, a screwed member securing the outer hub part upon the inner hub part, a pawl locking device removably secured to the outside of said member, and a tool for rotating said member which carries means for releasing said locking device, said means retaining said tool upon said member so long as said locking device is held in the released position.

5. In combination in a detachable wheel, an outer and an inner hub part, a screwed member for holding the outer hub part in position on the inner hub part, a cover removably secured to said member, a locking pawl pivotally mounted on the inside of said cover, a slot in said member, a projection on said pawl extending through said slot to engage with castellations on the outer hub part, and a tool for rotating said member which carries means for releasing said locking pawl, said means retaining said tool upon said member so long as said locking pawl is held in the released position.

6. In combination in a detachable wheel, an outer and an inner hub part, a screwed member for holding the outer hub part in position on the iner hub part, a cover removably secured to said member, a pawl pivotally mounted on the inside of said cover, a slot in said member, a projection on said pawl extending through said slot to engage with castellations on the outer hub part, said pawl having one edge flush with an edge of said cover when said projection is in engagement with said castellations, a tool for rotating said member and a cam carried by said tool which is inserted behind said cover to disengage said pawl from said castellations by which means said tool is retained upon said member so long as said pawl is held in the disengaged position.

7. In combination in a detachable wheel, an outer and an inner hub part, a screwed member for holding the outer hub part in position on the inner hub part, a plate having flanged edges fastened by two screws on the face of said member, said edges bearing upon said face and thus providing a space between said member and said plate, a pawl pivoted on the inside of said plate and capable of movement in said space, a slot in said member, a projection on said pawl extending through said slot to engage in castellations on the outer hub part, one edge of said pawl coinciding with an edge of said plate when said projection is so engaged, a spring positioned in one end of said space, and retained therein by one of said screws, and acting upon said pawl to retain it in engagement with said castellations but allowing disengagement of said pawl for backward rotation of said nut, a tool for rotating said member, and a movable cam carried by said tool for disengaging the pawl, the said action locking the tool upon said member so long as the pawl is held out of engagement.

In testimony whereof, I have affixed my signature in presence of two witnesses.

JOHN VERNON PUGH.

Witnesses:
ETHEL EVANS,
FLORENCE SKINNER.

Copies of this patent may be obtained for five cents each, by addressing the "Commissioner of Patents. Washington, D. C."